May 31, 1966     M. B. HUTSON     3,254,288
VARIABLE SPEED SQUIRREL CAGE INDUCTION MOTOR
Filed Sept. 14, 1962
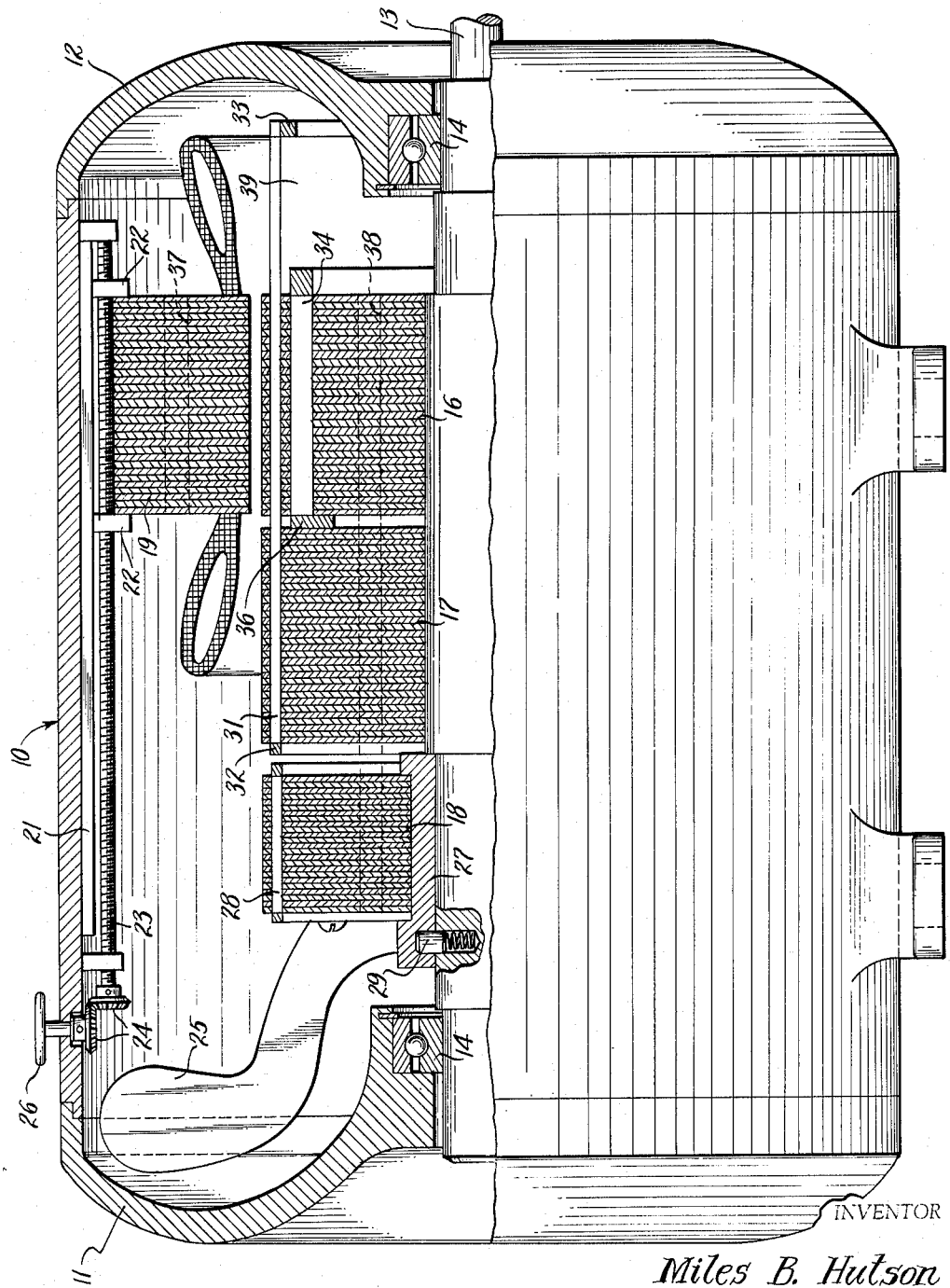
INVENTOR
*Miles B. Hutson*
BY *Holcombe, Wetherill & Brisebois*
ATTORNEYS

United States Patent Office 3,254,288
Patented May 31, 1966

3,254,288
VARIABLE SPEED SQUIRREL CAGE INDUCTION MOTOR
Miles B. Hutson, 321 Hillary St., New Orleans, La.
Filed Sept. 14, 1962, Ser. No. 223,602
12 Claims. (Cl. 318—243)

The present invention relates in general to variable speed squirrel cage induction motors with motor structure control of speed and running characteristics and more particularly to that type using multiple rotor sections with a single stator movable successively into surrounding relation with the different rotor sections, and is in the nature of an improvement over my prior Patents No. 2,922,098, granted January 19, 1960, and No. 2,599,694 granted November 8, 1960.

An object of the present invention is to obtain in a squirrel cage induction motor the advantage of high starting torque and efficient running characteristics of a double squirrel cage rotor together with adjustability of speed at will even at low torque.

Another object is to provide a relatively simple, low cost, rotor cage structure bringing into cooperative combination and relation a single cage high resistance section and double cage section with which the above object may be attained.

Various other objects and advantages of the invention will become apparent from a perusal of the following specification and the accompanying drawing in which the single view is a side elevation of my improved motor showing the upper half in section in a vertical axial plane.

Referring to the drawing in detail, a cylindrical frame piece 10 closed by end bells 11 and 12 form a housing for the motor, the end bells supporting the motor shaft 13 in suitable ball bearings 14. Fixedly mounted on the shaft are laminated driving rotor sections 16 and 17 of the usual or other suitable low reluctance material, and rotatably mounted on the shaft is a laminated nondriving rotor element 18 of similar material, nondriving in the sense that it does not impart torque to the motor shaft. A rotating-field stator element 19 of laminated low reluctance material is slidably mounted on longitudinal ways or guide rails 21, for longitudinal movement to bring the stator successively into surrounding relation with any of the rotor sections, for which purpose the stator and the driving rotor sections 16 and 17 are each given the same axial dimension.

Longitudinal movement of the stator is effected through traveling nuts 22 fixed to the stator and engaged by a feed screw 23 rotated through bevel gears 24 by a hand wheel 26. The nondriving rotor section 18 imparts little or no torque to the motor shaft, its chief function being to provide a low reluctance path for the stator magnetic field when surrounded thereby after removal of the stator field from the driving sections, and is mounted for rotation on the motor shaft through a suitable bearing element 27. Conductor bars 28 for the rotor element 18 generate sufficient torque when energized by the rotating field of the stator to effectively drive fan blades one of which is shown at 25, secured to the rotor 18. For driving the fan blades when the rotor section 18 is not in operative relation with the stator field and the motor shaft is being rotated by the driving rotor sections, a centrifugal clutch element 29 is provided, carried by the shaft for engagement with the rotor element 18 in response to attainment of a given rate of rotation of the shaft.

The rotor section 16 is of a double cage type having a high resistance low impedance outer cage circuit and a low resistance high impedance inner cage circuit but varies from the classic double cage structure in that the high resistance outer conductor bars 31 are extended on through the high resistance rotor section 17 to form with the end rings 32 and 33 a high resistance cage circuit common to both sections. The high resistance bars 31 thus cooperate with the deep set bars 34 of the driving section 16 to provide double squirrel cage characteristics and in section 17 provide for speed regulation at will even at low torque.

The low resistance high induction cage circuit of the rotor section 16 is formed in known manner by the relatively low resistance conductor bars 34 and end rings 36, the conductor bars 34 being placed in the bottom of deep slots where the leakage flux linking the embedded conductor bars 34 is relatively large giving a low resistance cage circuit of relatively large inductance. It is to be noted that the outer bars 31 may be provided with an intermediate ring incorporated with the ring 36.

Any known or other suitable arrangement may be provided for directing the air, or other gaseous fluid propelled by the fan blades 25, through the motor parts to transfer heat to the walls of the casing such as the air ducts 37 through the stator element and air ducts 38 through the rotor sections. Running the high resistance conductor bars 31 of the outer high resistance cage substantially straight through both rotor sections 16 and 17 to a space 39 in the path of the circulating cooling fluid beyond the rotor sections makes for extreme simplicity of structure and low cost of production with effective dissipation of heat from the high resistance circuit.

In operation with the stator 19 surrounding only the nondriving rotor 18 and full line voltage applied to the stator, the rotor 18 functions mainly as a magnetic shunt for the stator field to maintain a high reactance in the stator circuit and thus avoid undue current drain on the line, the rotor 18 however developing sufficient torque to effectively operate the fan blades 25 while rotating freely about the motor shaft on bearing 27.

To start rotation of the drive rotors 16 and 17, the stator is moved gradually into surrounding relation with the high resistance section 17 inducing current therein near the line frequency to start rotation of the shaft at low speed high torque. As the stator leaves the rotor 18 and shaft speed picks up, the centrifugal clutch 29 is actuated to lock the rotor 18 to the shaft for rotation therewith and so continue actuation of the fan blades 25.

To obtain full speed at rated load, the stator is moved on to full surrounding relation with section 16, which through the known automatic regulating action of the combination of high resistance low impedance conductor bars 31 and deep seated low resistance high impedance bars 34, tends to maintain a given substantially constant speed.

Now should it become desirable to adjust the speed at the rated or any lower load, this may be accomplished by adjustment of the field element toward the nondriving section 18, only slight movement of the field element being necessary for satisfactory adjustment of speed, the adjusted speed tending to be automatically maintained by the combined action of the common high resistance outer circuit bars and the deep set bars of section 16.

As will be clear from the foregoing, an important advantage of the present construction is that as the stator is moved away from the low resistance section 16 to reduce speed, such heating of the high resistance conductors or bars 31 as tends to occur is held below objectionable limits by extension of the high resistance bars 31 from the driving rotor sections, at the free end of the low resistance section 16, to spaced end ring 33, thus putting a substantial portion of the high resistance conductors outside the rotor sections for rotation in a free space and within the path of any circulating coolant that may be used.

While but one specific embodiment of the invention has been herein shown and described for the sake of disclosure, it is to be understood that the invention is not limited to such specific embodiment, but contemplates all such variants and modifications thereof as fall fairly within the scope of the appended claims.

What is claimed is:

1. In a squirrel cage induction motor of the type having rotor sections spaced axially along a driving shaft and a common stator element mounted to be brought successively into surrounding relation with said rotor sections; the combination of a single cage high resistance rotor section and a double cage rotor section having two sets of rotor circuits each with a pair of end rings and respectively formed by a low resistance high inductive inner cage, and a high resistance outer cage common to both said rotor sections, the pair of end rings for said outer cage being situated at opposite ends of the rotor, one of said latter pair of end rings being situated beyond the outer end of one of said rotor sections spaced out of direct thermal contact therewith.

2. In a squirrel cage induction motor, the combination of a high resistance rotor section and a double squirrel cage section, having outer and inner cages with separate pairs of end rings spaced axially along a driving shaft, said outer cage being common to both said sections and a stator element common to both sections movably mounted to be brought successively into surrounding relation with said rotor elements, whereby speed adjustments may be made at will to effect deviation from the one constant speed inherent in the double cage section alone.

3. A squirrel cage induction motor comprising in combination a high resistance rotor section and a double squirrel cage rotor section, having outer and inner cages with separate pairs of end rings spaced axially along a driving shaft, a stator element common to both sections movably mounted to be brought successively into surrounding relation with said rotor elements, said high resistance section and said double squirrel cage section having a common high resistance squirrel cage circuit whereby speed adjustment may be made by gradual reapportionment between activation of the double cage circuit and the common high resistance circuit.

4. A squirrel cage induction motor comprising a stator, a driving rotor having a double cage section and a single cage section, said double cage section having a deep set inner cage of relatively low resistance conductor bars and an outer cage separate from said inner cage and of relatively high resistance conductor bars extending in a substantially straight line through the single cage section near the periphery of both sections to form a high resistance cage element common to both sections, a second set of end rings for said outer cage, and means slidably mounting said stator for movement axially along said rotor from covering relation with one of said rotor sections to covering relation with the other.

5. A squirrel cage induction motor comprising a stator, a driving rotor having a double cage section of the type having separate inner and outer cage circuits, a single cage section, a relatively high resistance outer cage common to both sections in the form of straight conductor rods extending through both sections to end rings outside the ends of the rotor and constituting both the outer cage circuit for the double cage section and a single cage for the single cage section, a low resistance deep set cage individual to the double cage section having end rings separate from those of the outer cage and constituting the inner cage circuit of the double cage section, and means slidably mounting said stator for axial movement from covering relation with one of said sections to covering relation with the other.

6. A squirrel cage induction motor comprising a motor shaft, a driving rotor fixed to the rotor shaft and having a first section and a second section spaced axially along the shaft in close proximity, a common stator element for the rotor movably mounted to be brought successively into surrounding relation with said rotor sections, relatively high resistance conductor bars extending substantially straight through both sections near the periphery from end to end of the rotor to a pair of end rings outside the rotor, relatively low resistance conductor bars extending through only the first section between the high resistance bars and the center of the rotor, and a pair of end rings for the low resistance bars separate from the end rings of the high resistance bars and situated at the ends of said first section.

7. A squirrel cage induction motor as claimed in claim 6 in which one of the end rings of the high resistance bars is spaced axially from the rotor out of direct thermal contact with the rotor.

8. A squirrel cage induction motor comprising a stator, a driving rotor having a double squirrel cage section with separate high and low resistance circuits and a single squirrel cage section of substantially equal axial length, said stator having an axial length substantially equal to that of a section, an inner cage of relatively low resistance and high impedance in said double cage section constituting said low resistance circuit, a relatively high resistance cage common to both said sections near the periphery of each section constituting said high resistance circuit, a set of end rings for the low resistance cage, a set of end rings for the high resistance cage independent of the low resistance cage, and means slidably mounting said stator for axial movement along said rotor from covering relation with one of said sections to covering relation with the other.

9. A squirrel cage induction motor comprising a stator, a driving shaft, a driving rotor fixed on the driving shaft, having a double cage section with separate high and low resistance circuits and a single cage section positioned end-to-end, a nondriving rotor mounted for free rotation on the shaft at one end of the driving rotor, means slidably mounting said stator for movement successively into surrounding relation with said nondriving rotor and said driving rotor sections, said stator and rotors having air ducts passing therethrough, fan blades carried by said nondriving rotor for directing a stream of coolant through said air ducts, a relatively high resistance cage constituting said high resistance circuit common to both said driving rotor sections in the form of high resistance conductor bars extending through both sections to end rings outside the ends of the driving rotor, one of said end rings being situated at the end remote from the nondriving rotor and spaced therefrom in the path of said coolant, and centrifugal clutch means carried by said shaft for engagement with said nondriving rotor.

10. A variable speed squirrel cage induction motor comprising a motor shaft, a rotor element fixedly mounted on said shaft having two sections arranged end to end on said shaft, a relatively high resistance cage common to both sections with its conductor bars situated near the periphery of the rotor, a relatively low resistance cage individual to one of said sections deep seated between the common high resistance stage and the center of the rotor to impart relatively high inductive impedance thereto, and means mounting said stator for movement axially along said rotor from covering relation from one of said rotor sections to covering relation with the other.

11. A variable speed induction motor comprising a motor shaft, a rotor element fixedly mounted on said shaft having a single high resistance squirrel cage section and a double squirrel cage section with separate high resistance low inductance and low resistance high inductance circuits, said sections being arranged axially along said shaft end to end, and a stator element mounted to be brought successively into surrounding relation with said rotor sections.

12. A variable speed induction motor comprising a motor shaft, a rotor element fixedly mounted on said shaft having a single squirrel cage high resistance section and a double squirrel cage section with separate high resistance low inductance and low resistance high inductance circuits, said sections being arranged axially along said shaft end to end, a stator field shunting element mounted in axial alignment with said rotor sections at an end of the high resistance section remote from said double cage section, and a stator element mounted to be brought successively into surrounding relation with said rotor sections and said shunting element.

References Cited by the Examiner

UNITED STATES PATENTS

| | | | |
|---|---|---|---|
| 1,772,719 | 8/1930 | Johnson | 318—243 |
| 2,922,098 | 1/1960 | Hutson | 318—243 |
| 2,959,694 | 11/1960 | Hutson | 310—61 |

ORIS L. RADER, *Primary Examiner.*

C. E. ROHRER, G. Z. RUBINSON, *Assistant Examiners.*